United States Patent [19]

Harrod et al.

[11] Patent Number: 4,555,451
[45] Date of Patent: Nov. 26, 1985

[54] STORAGE BATTERY WITH BUILT-IN FUSE

[75] Inventors: Lawrence R. Harrod; Lucio C. Perego, both of Ft. Wayne, Ind.

[73] Assignee: Pines of America, Inc., Fort Wayne, Ind.

[21] Appl. No.: 695,961

[22] Filed: Jan. 29, 1985

[51] Int. Cl.⁴ .......................................... H01M 2/30
[52] U.S. Cl. ........................................ 429/1; 429/7; 429/61; 429/178
[58] Field of Search ................ 429/1, 7, 9, 61, 62, 429/181, 121, 122, 178

[56] References Cited

U.S. PATENT DOCUMENTS

| | | | |
|---|---|---|---|
| 3,301,713 | 1/1967 | Lozeau | 429/7 |
| 3,770,511 | 11/1973 | Winterbottom et al. | 429/121 |
| 3,937,636 | 2/1976 | Slautterback | 429/7 |
| 4,217,400 | 8/1980 | Leffingwell | 429/61 |

Primary Examiner—Donald L. Walton
Attorney, Agent, or Firm—George A. Gust

[57] ABSTRACT

A battery structure comprising: an enclosure; fuse receiving recess means in the enclosure open on at least one side of the enclosure to allow direct entry of a fuse from outside the enclosure; at least one cell comprising a cell terminal within the enclosure; first and second fuse holder terminals rigidly supported in the fuse receiving recess means to hold fuse terminals; and an electrical connection between the cell terminal and the first fuse; holder terminal, said enclosure comprising immovable means enclosing the connection and the cell terminal.

7 Claims, 3 Drawing Figures

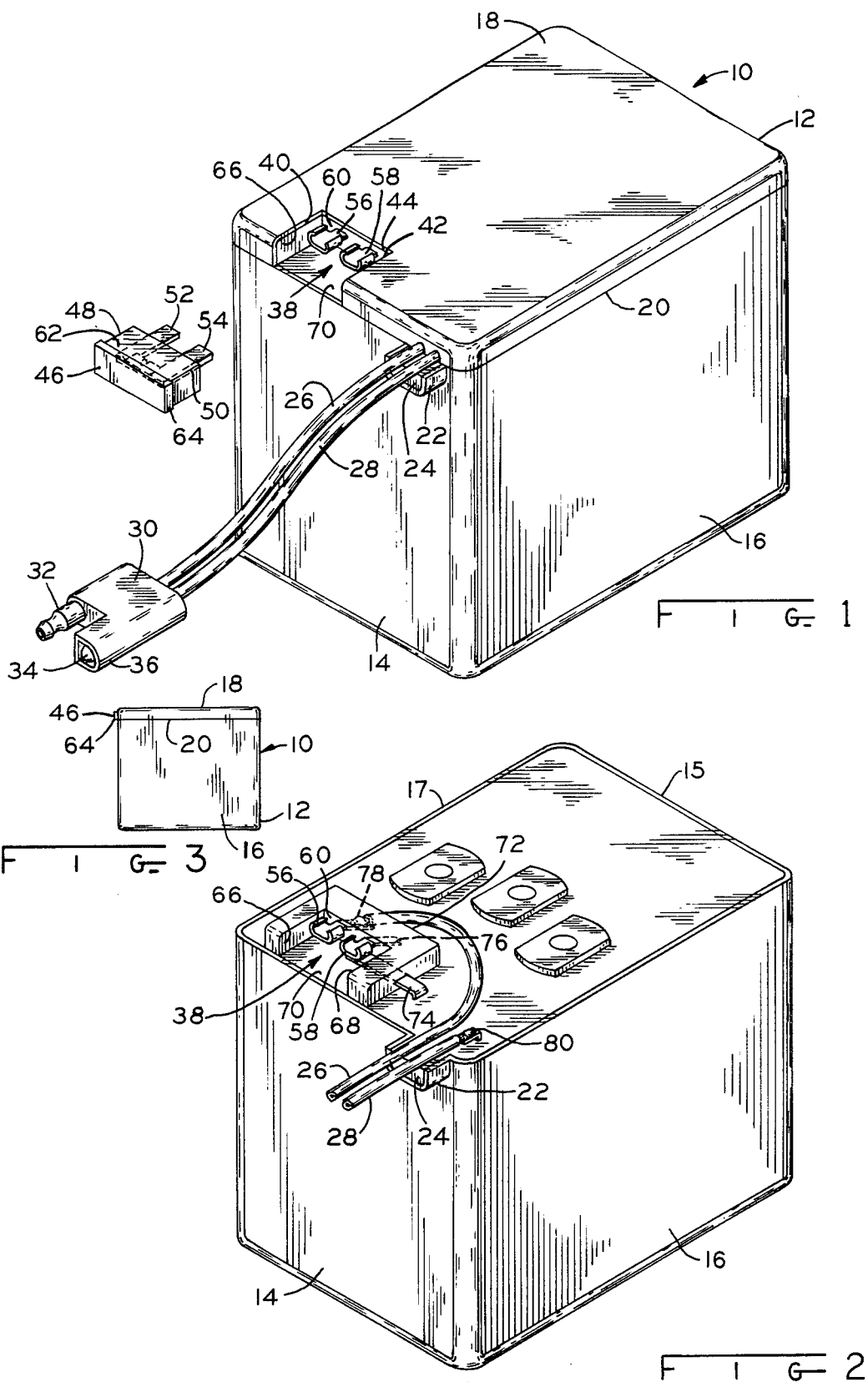

STORAGE BATTERY WITH BUILT-IN FUSE

BACKGROUND OF THE INVENTION

Field of the Invention

This invention relates to the field of battery protection and particularly to a battery structure with a built-in fuse holder to place a fuse directly in series between the current-generating cell and one of the battery terminals.

It is well known that batteries of a certain size, and particularly, but not exclusively, those used in riding toys of a type large enough to be ridden by small children, can discharge through a very low-impedance circuit at a rate fast enough to generate a dangerous amount of heat capable of starting fires and burning anyone who touches the circuit components. As a result, it is common practice to connect a fuse in series with the battery to break the circuit if the current is excessive. While a fuse can protect the battery against a short-circuit connection beyond the fuse, it does not provide any protection against a short-circuit connection directly across the battery terminals. In fact, some batteries have their terminals at the ends of wires several inches long, and it is possible to create a short-circuit connection from one of those wires to another at a location between the terminals and the main part of the battery structure, if, for example, a metal member that is essentially like a blade cuts across the wires.

It is particularly important to guard against such an eventuality in childrens' toys. The children cannot be expected to understand the danger if such a short-circuit connection occurs, and furthermore, the batteries used in childrens' riding toys must be capable of furnishing a relatively high current of several amperes in normal usage so that the possible current under short-circuit conditions will be quite dangerously high.

Batteries are also subject to being heated more slowly, for example, by a overload that draws an excessive current but not as much as a short-circuit connection. It is common to provide thermal protection for batteries by putting a thermal shutdown device, which is similar to a thermostat in series with the battery terminals and inside the battery case. Excessive heat in the case causes bimetallic elements in the thermal shutdown device to bend, thereby open contacts in series with the terminals and rendering the battery inoperative until it cools down.

While thermal shutdown devices interrupt the flow of current from the battery, they do not operate with the almost instantaneous speed of fuses, and since they are self-resetting, they do not provide the permanent protection that fuses do. A thermally protected battery that remains connected to an overload would be repeatedly connected to and disconnected from the overload until the charge generated or stored in the battery was dissipated. The fuse in a fuse-protected circuit would blow on the first overload and the circuit would remain open thereafter until the fuse was replaced, at which time, presumably, the element causing the overload would be removed.

Because a thermal shutdown device is self-resetting, it can be built in as a permanent part of the battery. A fuse, on the other hand, must be replaceable, which means that some means must be provided to insert the fuse into a holder that is part of the battery structure, and as to the holder and its terminals, must not include openings that destroy the integrity of the battery case, or enclosure. This is especially true in the case of gel-type storage batteries used in toy vehicles large enough to be ridden by children. It is essential that there be no opening that would permit the electrolyte in the battery case to leak out.

It has been proposed in the past to incorporate a fuse within the battery case and electrically connected in series with one of the cell terminals within the case so that the fuse is electrically between that cell terminal and one of the battery terminals to which electrical circuits can be connected. U.S. Pat. No. 3,937,636 to Slautterback, issued Feb. 10, 1976, discloses a fuse-protected battery, but the fuse and connections to each end of it are covered only by a hinged plate. If opened, this plate uncovers the connection from the fuse to the cell terminal, such exposure of that connection is very undesirable in that it provides undesirably easy access to the cell terminal and would make it possible to place a short circuit between cell terminals without forcing the short-circuit current to flow through, and immediately blow, the fuse.

U.S. Pat. Nos. 4,217,400 and 4,315,364 to Leffingwell, issued Aug. 12, 1980 and Feb. 16, 1982, respectively, show a fused battery pack in which the fuse is within the pack and is therefore not directly accessible from outside the pack, as required for ease of replacement. When the part of Leffingwell's enclosure that covers the fuse is opened, the cell terminals are directly accessible.

SUMMARY OF THE INVENTION

It is an object of this invention to protect batteries against being short-circuited, even across their terminals.

Another object is to provide an improved battery structure that includes means for receiving a fuse connected in series with the battery.

A further object is to provide a battery with an enclosure that encloses the cell or cells as well as terminals for a fuse holder and a connection between one of the fuse holder terminals and one of the cell terminals.

Further objects will be in part stated and in part apparent from the following description and the accompanying drawings.

In accordance with this invention, a fuse holder is electrically connected in series between the current source cell and one of the terminals of a battery. The connection between one of the fuse holder terminals and the cell is inside a rigid protective enclosure so that no external circuit components can directly reach that cell terminal except by way of that fuse holder terminal. The other fuse holder terminal is connected to, or could even serve as, one of the battery terminals, so that any short circuit connection between that battery terminal and the other battery terminal of opposite polarity would simply result in blowing the fuse. The fuse holder structure is so arranged that a recess is provided to receive most or all of the fuse within the battery enclosure and to make it virtually impossible for any external element to become accidentally connected between the fuse holder terminal connected to the cell terminal and the battery terminal of the opposite polarity.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective view of a battery incorporating the invention;

FIG. 2 is a perspective view of the battery in FIG. 1 from the same point of view but with the top of the battery removed; and FIG. 3 is a side elevational view of the battery in FIG. 1.

DESCRIPTION OF THE PREFERRED EMBODIMENT

Referring to the drawings, the embodiment of the battery 10 illustrated includes an outer case 12 molded of a suitable thermoplastic material that has good dimensional stability and high impact resistance, although it could be made of metal by taking precautions to see that electrical connections to the battery are not short circuited. In this embodiment the case is a parallelepiped with two short sides, 14 and 15, two long sides, 16 and 17, a bottom (not shown), and a top 18. The top is not just a flat plate but also includes a small part of each of the sides 14–17. The edges of the small parts of the four sides 14–17 extending downwardly from the top 18 meet the main parts of those sides at a parting line 20.

In the upper right-hand corner region of the side 14, just under the parting line 20, is a channel 22 of U-shaped cross section filled with a suitable material 24, such as an epoxy potting compound, to support two insulated wire leads 26 and 28 connected to two battery terminals in a connector 30. The connector is polarized to join with an identical connector (not shown) that is part of the wiring harness of any device, for example, a battery-powered child's riding toy, in which the battery 10 may be used. The connector 30 includes a male battery terminal 32 and a female terminal 34, which is mostly hidden within an insulating sleeve 36. The voltage polarity of the two terminals 32 and 34 happen to be chosen so that the terminal 32 is the negative one and terminal 34 the positive one in this embodiment, but the polarities could just as well have been the reverse.

The battery 10 has a recess 38, which forms a notch in the top 18. This notch is defined by two parallel edges 40 and 42 and a third edge 44. The edges 40 and 42 are spaced apart just enough to accommodate the width of a fuse 46 as measured between its two parallel edges 48 and 50. The distance from the wall 14 to the edge 44 corresponds to the depth of the fuse as measured by the length of the edges 48 and 50. The fuse is a standard automotive type fuse and, for a gel-type rechargeable battery 10, rated at six volts and 9.5 amps., the fuse should be able to carry a current of up to approximately 25 amps. It should be understood that none of these battery specifications are to be considered as limiting this invention; all of them are merely exemplary. The fuse has two blade-type terminals, 52 and 54, and the battery 10 has two corresponding female fuse holder terminals 56 and 58 rigidly mounted in a recessed wall portion 60 that forms part of the case, or enclosure, 12.

The fuse holder terminals 56 and 58 are spaced apart by a fixed distance that corresponds to the spacing of the blade-type terminals 52 and 54, and the terminals 56 and 58 have a configuration capable of receiving the terminals 52 and 54. The entrances to the terminals 56 and 58 are spaced downwardly from the upper surface of the top 18 by a distance commensurate with the spacing between the surface 62 of the fuse 46 and its terminals 52 and 54 so that the surface 62 is substantially coplanar with the upper surface of the top 18 when the fuse 46 is plugged into the terminals 56 and 58. The fuse has a lip 64 that extends laterally outwardly from the edges 48 and 50 to provide gripping surfaces for removing a blown fuse from the terminal 56 and 58. As shown in FIG. 3, the lip does not fit into the battery case 12 when the fuse 46 is inserted in its operative position.

In order to allow the fuse 46 to slide straight into the recess 38 at the top of the case 12, part of the side 14 between the parting line 20 and the top 18 is also cut away. The recess has two sides 66 and 68 and a floor 70 that constitutes part of the upper surface of the potting material in which the battery cells (not shown) are enclosed. More of the surface 70 is shown in FIG. 2. As may be seen in that Figure, the surface 70 of the potting material is level with the parting line 20, although it could be below the level of the parting line.

The fuse holder structure is better shown in FIG. 2. It is formed of a quantity of solidified plastic material 72, such as an epoxy resin or the like molded into a generally U-shaped configuration on the surface 70. A terminal strap 74 of a battery cell (not shown) extends upwardly through the surface 70 and is bent over approximately parallel to that surface. The terminal strap 74 is welded or soldered or otherwise permanently conductively connected to the fuse holder terminal 58 to form an excellent electrical and mechanical connection therewith. The terminal 58 is shown as having a tongue 76, typical of such terminals, molded into the material 72 to provide a fixed mounting for the terminal 58 relative to the case 12 and the cell or cells out of sight below the surface 70.

The other fuse holder terminal 56 has a tongue 78 embedded in the material 72 and is securely connected to one end of the wire 26 that leads to the battery terminal 32 in FIG. 1, in this embodiment. Another cell terminal 80 extends up through the surface 70 and is welded, soldered, or otherwise well connected to the wire 28 leading to the terminal 34 in FIG. 1.

When the top 18 is put in place and the small upper parts of the sides 14–17 are rigidly and permanently joined to the larger parts of those sides at the parting line 20, the battery 10 will have a built-in fuse protection, but the fuse 46 will be directly accessible from outside the case 12. In particular, the cell terminal 74 is within the case 12 and is protected by the rigid portion of the top 18 directly overhead, so that the cell terminal 74 cannot be directly connected to the terminal 80.

The battery terminals 32 and 34 are shown as being at the ends of wires 26 and 28, and, because of the fuse 46, a direct connection between those terminals would only blow the fuse and not damage the battery 10 or cause a fire. Other battery structures are also possible within the scope of this invention. For example, instead of using wires 26 and 28, the battery terminals could be mounted fixedly on the case 12. The cell terminal 80 could be a battery terminal or could be directly and rigidly connected to a battery terminal, and the fuse holder terminal 56 could be the other battery terminal or could be directly and rigidly connected to the other battery terminal. These and still further modifications could be made within the scope of the invention as defined by the claims.

While there have been described above the principals of this invention in connection with specific apparatus, it is to be clearly understood that this description is made only by way of example and not as a limitation to the scope of the invention.

What is claimed is:

1. A battery structure comprising:
an enclosure;
at least one cell rigidly enclosed by said enclosure, said at least one cell forming a battery having first and second cell terminals within said enclosure;
fuse receiving recess means, formed in the enclosure so as to open externally of the enclosure on at least one side of the enclosure, for removably accepting a conventionally encapsulated two terminal fuse inserted from outside the enclosure to a position substantially within said recess means;
first and second fuse holder terminals rigidly supported in the fuse receiving recess means and adapted to hold the respective terminals of said fuse inserted therein;
a first electrical connection between the first cell terminal and the first fuse holder terminal, said first connection being immovably disposed fully within said enclosure;
a second electrical connection between the second fuse holder terminal, at a portion thereof within said enclosure, and a first battery terminal external of said enclosure; and
a third electrical connection between the second cell terminal, disposed within said enclosure, and a second battery terminal external of said enclosure.

2. The battery structure in claim 1 in which the fuse receiving recess means comprises an insulating wall structure forming a recess internal of said enclosure, and the fuse holder terminals are fixedly mounted extending through the wall structure and comprise fuse terminal receiving means facing outside of the enclosure means but within said recess.

3. The battery structure in claim 1 in which the recess means comprises a generally U-shaped molded plastic structure shaped to receive a fuse substantially within a recess thus formed in the enclosure, and the fuse holder terminals are embedded in the U-shaped molded plastic structure.

4. A fuse-protected battery comprising:
an enclosure;
a cell comprising a first and a second cell terminal in the enclosure and rigidly covered by a fixed portion of the enclosure;
a first fuse holder terminal connected inside the enclosure to the first cell terminal;
a second fuse holder terminal rigidly supported relative to the first fuse holder terminal; and a two contact battery terminal accessible from outside the enclosure and having one contact electrically connected inside the enclosure to the second fuse holder terminal and the other contact electrically connected inside the enclosure to the second cell terminal.

5. The battery of claim 4 in which the cell is entirely inside the enclosure.

6. A battery structure comprising:
at least one cell with a cell terminal and a cell return contact;
fuse holder means comprising first and second fuse holder terminals rigidly supported relative to the cell and relative to each other;
a first electrical connection between the cell terminal and the first fuse holder terminal, the second fuse holder terminal comprising a first contact of a mechanically integral battery terminal;
a second electrical connection between the cell return contact and a second contact of the battery terminal, said first and said second contacts of the battery terminal being mutually electrically separated; and
a battery case fixedly enclosing the cell, the cell terminal, the cell return contact, the first connection and portions of the first and second fuse holder terminals and a portion of the second connection, said battery terminal comprising a terminal outside of said case.

7. The battery structure of claim 6 in which the case has a top and the fuse holder means extend into a recess formed in the top of the case.

* * * * *